United States Patent
Uchino et al.

(10) Patent No.: US 9,874,269 B2
(45) Date of Patent: Jan. 23, 2018

(54) CONTINUOUSLY VARIABLE TRANSMISSION

(71) Applicant: HONDA MOTOR CO., LTD., Tokyo (JP)

(72) Inventors: Satoshi Uchino, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 14/893,798

(22) PCT Filed: May 27, 2014

(86) PCT No.: PCT/JP2014/063989
§ 371 (c)(1),
(2) Date: Nov. 24, 2015

(87) PCT Pub. No.: WO2014/192752
PCT Pub. Date: Dec. 4, 2014

(65) Prior Publication Data
US 2016/0109000 A1 Apr. 21, 2016

(30) Foreign Application Priority Data
May 28, 2013 (JP) .................. 2013-112030

(51) Int. Cl.
*F16H 37/02* (2006.01)
*F16H 37/06* (2006.01)
(52) U.S. Cl.
CPC ......... *F16H 37/021* (2013.01); *F16H 37/022* (2013.01); *F16H 2037/025* (2013.01); *F16H 2037/026* (2013.01)
(58) Field of Classification Search
CPC ........... F16H 2702/06; F16H 2037/023; F16H 2037/0873; F16H 2037/0886
(Continued)

(56) References Cited

U.S. PATENT DOCUMENTS 4,539,866 A 9/1985 Koivunen
5,071,391 A 12/1991 Kita
(Continued)

FOREIGN PATENT DOCUMENTS

CN 87 1 07940 A 6/1988
CN 200999844 Y 1/2008
(Continued)

OTHER PUBLICATIONS

International Search Report dated Sep. 2, 2014, issued in International Application No. PCT/JP2014/063990 (2 pages).
(Continued)

*Primary Examiner* — Ha D Ho
(74) *Attorney, Agent, or Firm* — Westerman, Hattori, Daniels & Adrian, LLP

(57) ABSTRACT

In a continuously variable transmission, driving force from a drive source is transmitted via the path: first input switching mechanism→first input path→first countershaft→first pulley→endless belt→second pulley→second countershaft→first output path→second input shaft→first output switching mechanism→output shaft to thus establish a LOW mode. A large torque that is transmitted in the LOW mode passes through the first output switching mechanism, but since the second input shaft is relatively rotatably disposed on the outer periphery of the first input shaft and the first output switching mechanism is disposed on the second input shaft, it is possible to enhance the rigidity of the input shaft due to the double tube structure formed from the first input shaft and the second input shaft and to support the first output switching mechanism with high rigidity without carrying out special reinforcement.

10 Claims, 12 Drawing Sheets

(58) Field of Classification Search
USPC .................. 74/664, 665 R; 475/210, 213
See application file for complete search history.

(56) References Cited

U.S. PATENT DOCUMENTS

| | | | | |
|---|---|---|---|---|
| 5,207,617 | A * | 5/1993 | Kato | F16H 61/66259 474/28 |
| 5,846,152 | A * | 12/1998 | Taniguchi | F16H 37/0846 475/210 |
| 6,997,831 | B2 * | 2/2006 | Kanda | F16H 37/021 192/3.63 |
| 8,771,116 | B2 * | 7/2014 | Triller | F16H 37/021 474/72 |
| 2007/0021259 | A1 | 1/2007 | Tenberge | |
| 2012/0244973 | A1 | 9/2012 | Horiike | |

FOREIGN PATENT DOCUMENTS

| | | |
|---|---|---|
| CN | 101526123 A | 9/2009 |
| DE | 42 07 093 A1 | 4/1993 |
| DE | 42 34 629 A1 | 4/1993 |
| DE | 196 31 072 A1 | 2/1998 |
| EP | 1 347 209 A2 | 9/2003 |
| JP | 60-113850 A | 6/1985 |
| JP | 2000-320630 A | 11/2000 |
| JP | 2008-208854 A | 9/2008 |
| JP | 2009-503379 A | 1/2009 |
| JP | 2010-530503 A | 9/2010 |
| JP | 2010-261544 A | 11/2010 |
| JP | 2011-122684 A | 6/2011 |
| WO | 2013/175568 A1 | 11/2013 |

OTHER PUBLICATIONS

International Search Report dated Sep. 2, 2014, issued in counterpart International Application No. PCT/JP2014/063989 (2 pages).
Office Action dated Mar. 23, 2017, issued in counterpart Chinese Application No. 201480025806.4, with English translation. (15 pages).

* cited by examiner

LOW MODE

| LOW FRICTION CLUTCH 24A | ON |
|---|---|
| HI FRICTION CLUTCH 24B | OFF |
| FIRST OUTPUT SWITCHING MECHANISM 37 | RIGHT (LOW) |
| SECOND OUTPUT SWITCHING MECHANISM 38 | NEUTRAL |

TRANSITION MODE 1

| | |
|---|---|
| LOW FRICTION CLUTCH 24A | ON |
| HI FRICTION CLUTCH 24B | OFF |
| FIRST OUTPUT SWITCHING MECHANISM 37 | RIGHT (LOW) |
| SECOND OUTPUT SWITCHING MECHANISM 38 | RIGHT (HI) |

TRANSITION MODE 2

| | |
|---|---|
| LOW FRICTION CLUTCH 24A | OFF |
| HI FRICTION CLUTCH 24B | ON |
| FIRST OUTPUT SWITCHING MECHANISM 37 | RIGHT (LOW) |
| SECOND OUTPUT SWITCHING MECHANISM 38 | RIGHT (HI) |

HI MODE

| LOW FRICTION CLUTCH 24A | OFF |
| --- | --- |
| HI FRICTION CLUTCH 24B | ON |
| FIRST OUTPUT SWITCHING MECHANISM 37 | NEUTRAL |
| SECOND OUTPUT SWITCHING MECHANISM 38 | RIGHT (HI) |

RVS MODE

| LOW FRICTION CLUTCH 24A | ON |
|---|---|
| HI FRICTION CLUTCH 24B | OFF |
| FIRST OUTPUT SWITCHING MECHANISM 37 | LEFT (RVS) |
| SECOND OUTPUT SWITCHING MECHANISM 38 | NEUTRAL |

DIRECTLY COUPLED LOW MODE

| LOW FRICTION CLUTCH 24A | ON |
|---|---|
| HI FRICTION CLUTCH 24B | OFF |
| FIRST OUTPUT SWITCHING MECHANISM 37 | NEUTRAL |
| SECOND OUTPUT SWITCHING MECHANISM 38 | RIGHT (HI) |

DIRECTLY COUPLED HI MODE

| LOW FRICTION CLUTCH 24A | OFF |
|---|---|
| HI FRICTION CLUTCH 24B | ON |
| FIRST OUTPUT SWITCHING MECHANISM 37 | RIGHT (LOW) |
| SECOND OUTPUT SWITCHING MECHANISM 38 | NEUTRAL |

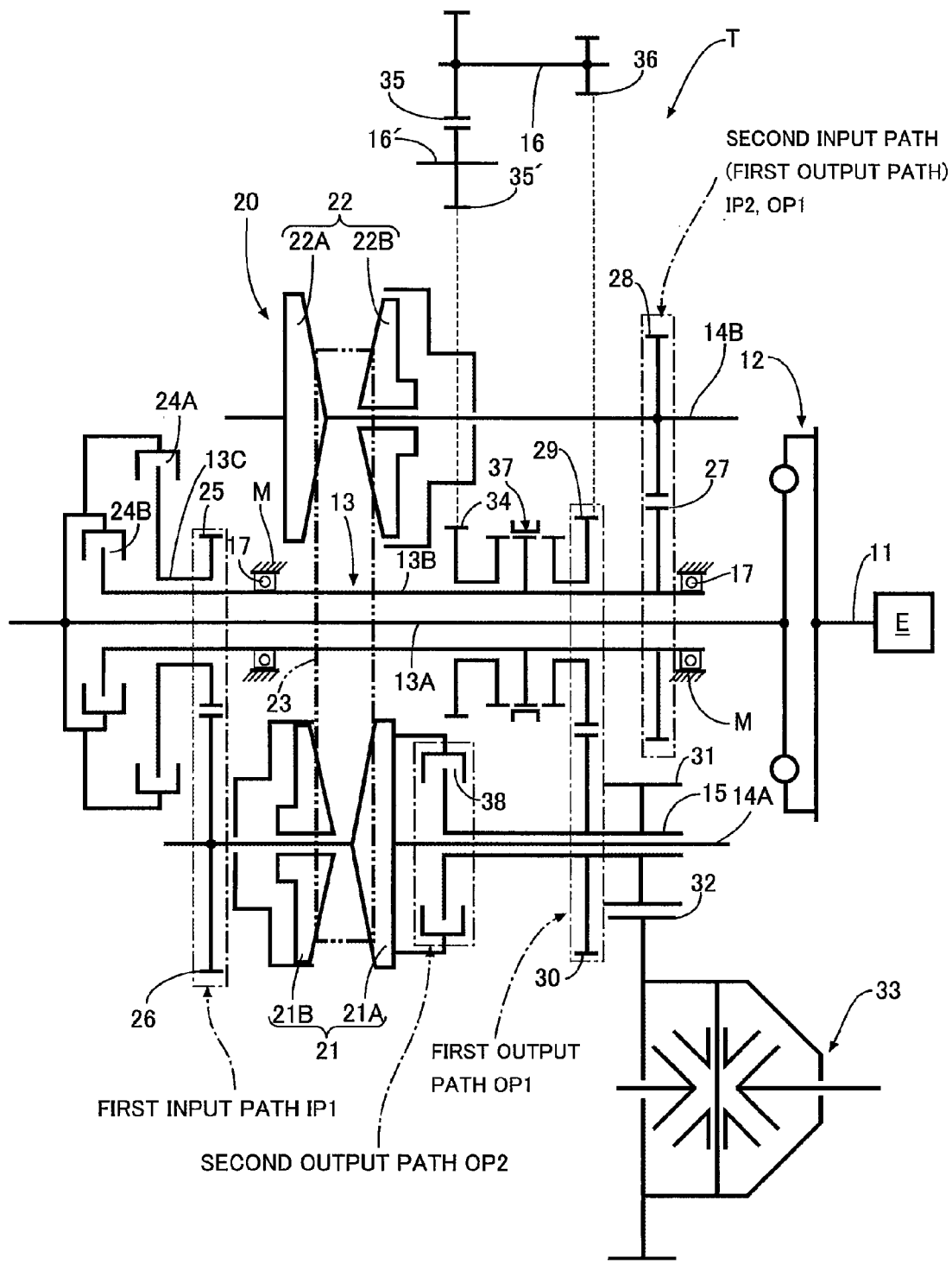

CONTINUOUSLY VARIABLE TRANSMISSION

TECHNICAL FIELD

The present invention relates to a continuously variable transmission in which a belt type continuously variable transmission mechanism is combined with a speed decreasing mechanism and a speed increasing mechanism.

BACKGROUND ART

There is known from Patent Document 1 below a continuously variable transmission that includes an input shaft, an output shaft, a belt type continuously variable transmission mechanism having a first pulley and a second pulley connected via an endless belt, a clutch that connects the input shaft and the first pulley via a gear train, a clutch that connects the input shaft and the second pulley via a gear train, a clutch that connects the output shaft and the first pulley via a gear train, and a clutch that connects the output shaft and the second pulley via a gear train, the overall gear ratio being enlarged by combining a mode in which a driving force is transmitted from the first pulley to the second pulley and a mode in which a driving force is transmitted from the second pulley to the first pulley.

Such a continuously variable transmission in which a first clutch and a second clutch are disposed at opposite ends of an input shaft connected to an engine, the driving force of the input shaft is transmitted to a first pulley of a belt type continuously variable transmission mechanism by means of engagement of the first clutch to thus establish a LOW mode, and the driving force of the input shaft is transmitted to a second pulley of the belt type continuously variable transmission mechanism by means of engagement of the second clutch to thus establish a HI mode has been proposed by PCT/JP2012/063029 (International Patent Publication Laid-open No. WO2013/175568) filed by the present applicant.

RELATED ART DOCUMENTS

Patent Documents

Patent Document 1: Japanese Patent Publication (PCT) No. 2010-530503

SUMMARY OF THE INVENTION

Problems to be Solved by the Invention

Of the continuously variable transmissions proposed in PCT/JP2012/063029 above, in an embodiment shown in FIG. 20, when the LOW mode is established by means of engagement of the first clutch, the driving force of the engine E is transmitted from the input shaft via the path: first clutch→first pulley→endless belt→second pulley→dog clutch (output switching mechanism) supported on input shaft→differential gear. Since the torque transmitted is larger in the LOW mode than in the HI mode, it is necessary to strongly support the dog clutch so that it can withstand a large torque. However, since the dog clutch is not directly supported on a transmission case but is supported via the input shaft, in order for it to be strongly supported it is necessary to increase the diameter of the input shaft, which does not need to transmit a large torque, thus causing the problem that the weight increases.

The present invention has been accomplished in light of the above circumstances, and it is an object thereof to enhance the support rigidity by directly supporting on a transmission case an output switching mechanism that is supported on the outer periphery of an input shaft and transmits a large torque in a LOW mode.

Means for Solving the Problems

In order to attain the above object, according to a first aspect of the present invention, there is provided a continuously variable transmission comprising an input shaft into which driving force from a drive source is inputted, a belt type continuously variable transmission mechanism that is formed from a first pulley, a second pulley and an endless belt, an output shaft that outputs the driving force whose speed has been changed by the belt type continuously variable transmission mechanism, a first input path that transmits the driving force from the drive source to the first pulley, a first input switching mechanism that switches the driving force from the drive source toward the first input path side, a speed decreasing mechanism that is disposed in the first input path and decreases the speed of an input to the first pulley, a second input path that transmits the driving force from the drive source to the second pulley, a second input switching mechanism that switches the driving force from the drive source toward the second input path side, a speed increasing mechanism that is disposed in the second input path and increases the speed of an input to the second pulley, a first output path that outputs the driving force from the second pulley, a second output path that outputs the driving force from the first pulley, a first output switching mechanism that is disposed in the first output path and switches the driving force from the second pulley toward the output shaft side, and a second output switching mechanism that is disposed in the second output path and switches the driving force from the first pulley toward the output shaft side, wherein the first and second input switching mechanisms are disposed on the same side as the drive source when viewed from the belt type continuously variable transmission mechanism, the input shaft comprises a first input shaft that transmits the driving force from the first input switching mechanism to the first input path and a second input shaft that transmits the driving force from the second input switching mechanism to the second input path, the second input shaft is relatively rotatably disposed on an outer periphery of the first input shaft and supported on a transmission case via a bearing, the first output switching mechanism is disposed on the second input shaft, and the second output switching mechanism is disposed on a rotating shaft of the first pulley.

Further, according to a second aspect of the present invention, there is provided a continuously variable transmission comprising an input shaft into which driving force from a drive source is inputted, a belt type continuously variable transmission mechanism that is formed from a first pulley, a second pulley and an endless belt, an output shaft that outputs the driving force whose speed has been changed by the belt type continuously variable transmission mechanism, a first input path that transmits the driving force from the drive source to the first pulley, a first input switching mechanism that switches the driving force from the drive source toward the first input path side, a speed decreasing mechanism that is disposed in the first input path and decreases the speed of an input to the first pulley, a second input path that transmits the driving force from the drive source to the second pulley, a second input switching mechanism that switches the driving force from the drive source toward the second input path side, a speed increasing mechanism that is disposed in the second input path and increases the speed of an input to the second pulley, a first output path that outputs the driving force from the second pulley, a second output path that outputs the driving force from the first pulley, a first output switching mechanism that is disposed in the first output path and switches the driving force from the second pulley toward the output shaft side, and a second output switching mechanism that is disposed in the second output path and switches the driving force from the first pulley toward the output shaft side, wherein the first and second input switching mechanisms are disposed on a side opposite to the drive source when viewed from the belt type continuously variable transmission mechanism, the input shaft comprises a first input shaft that transmits the driving force from the drive source to the first and second input switching mechanisms and a second input shaft that transmits the driving force from the second input switching mechanism to the second input path, the second input shaft is relatively rotatably disposed on an outer periphery of the first input shaft and supported on a transmission case via a bearing, the first output switching mechanism is disposed on the second input shaft, and the second output switching mechanism is disposed on a rotating shaft of the first pulley.

Furthermore, according to a third aspect of the present invention, in addition to the first aspect, the first pulley comprises a first fixed pulley and a first movable pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions, one of gears forming the speed increasing mechanism is disposed on a rear face side of the second fixed pulley, the second output switching mechanism and the output shaft are disposed on a rear face side of the first fixed pulley, and the first output switching mechanism and the second output switching mechanism are disposed at positions where at least parts thereof overlap one another in an axial direction.

Moreover, according to a fourth aspect of the present invention, in addition to the second aspect, the first pulley comprises a first fixed pulley and a first movable pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions, one of gears forming the speed increasing mechanism is disposed on a rear face side of the second movable pulley, the second output switching mechanism and the output shaft are disposed on a rear face side of the first fixed pulley, and the first output switching mechanism and the second output switching mechanism are disposed at positions where at least parts thereof overlap one another in an axial direction.

Further, according to a fifth aspect of the present invention, in addition to any one of the first to fourth aspects, at least one of the first output switching mechanism and the second output switching mechanism is formed from a friction clutch.

Furthermore, according to a sixth aspect of the present invention, in addition to the fifth aspect, the second output switching mechanism is formed from a friction clutch.

Moreover, according to a seventh aspect of the present invention, in addition to any one of the first to sixth aspects, the first output switching mechanism is formed from a dog clutch that can selectively join a first drive gear and a second drive gear, which are relatively rotatably supported on the second input shaft, to the second input shaft, the first drive gear is connected to a driven gear provided on the output shaft, and the second drive gear is connected to the first drive gear or the driven gear via an idle shaft.

Further, according to an eighth aspect of the present invention, in addition to any one of the first to seventh aspects, the first input switching mechanism and the second input switching mechanism are integrated.

Furthermore, according to a ninth aspect of the present invention, in addition to any one of the first to eighth aspects, the first output path also functions as the second input path.

Moreover, according to a tenth aspect of the present invention, in addition to the seventh aspect, when a gear ratio of the speed decreasing mechanism is $i_{red}$, a gear ratio of the speed increasing mechanism is $i_{ind}$, the minimum ratio between the first pulley and the second pulley is $i_{min}$, and a gear ratio between the first drive gear and the driven gear is $i_{sec}$, the relationship $i_{red} \times i_{min} = i_{ind}$ and the relationship $i_{sec} = i_{red}$ hold.

A LOW friction clutch 24A of an embodiment corresponds to the first input switching mechanism of the present invention, a HI friction clutch 24B of the embodiment corresponds to the second input switching mechanism of the present invention, a first reduction gear 25 and a second reduction gear 26 of the embodiment correspond to the speed decreasing mechanism of the present invention, a first induction gear 27 and a second induction gear 28 of the embodiment correspond to the speed increasing mechanism of the present invention, a third reduction gear 29 of the embodiment corresponds to the first drive gear of the present invention, a fourth reduction gear 30 of the embodiment corresponds to the driven gear of the present invention, and a reverse drive gear 34 of the embodiment corresponds to the second drive gear of the present invention.

Effects of the Invention

In accordance with the first aspect of the present invention, the driving force from the drive source is transmitted via the path: first input switching mechanism→first input shaft→first input path→first pulley→endless belt→second pulley→first output path→second input shaft→first output switching mechanism→output shaft to thus establish a LOW mode, and the driving force from the drive source is transmitted via the path: second input switching mechanism→second input shaft→second input path→second pulley→endless belt→first pulley→second output switching mechanism→output shaft to thus establish a HI mode. A large torque that is transmitted in the LOW mode passes through the first output switching mechanism, but since the second input shaft is relatively rotatably disposed on the outer periphery of the first input shaft and the first output switching mechanism is disposed on the second input shaft, it is possible, by disposing the second input shaft, which transmits a large torque, on the outer peripheral side of the double tube and supporting it directly on the transmission case due to the double tube structure formed from the first input shaft and the second input shaft, to support the first output switching mechanism with high rigidity without carrying out special reinforcement.

Furthermore, in accordance with the second aspect of the present invention, the driving force from the drive source is transmitted via the path: first input shaft→first input switching mechanism→first input path→first pulley→endless belt→second pulley→first output path→second input shaft→first output switching mechanism→output shaft to thus establish a LOW mode, and the driving force from the drive source is transmitted via the path: first input shaft→second input switching mechanism→second input shaft→second input path→second pulley→endless belt→first pulley→second output switching mechanism→output shaft to thus establish a HI mode. A large torque that is transmitted in the LOW mode passes through the first output switching mechanism, but since the second input shaft is relatively rotatably disposed on the outer periphery of the first input shaft and the first output switching mechanism is disposed on the second input shaft, it is possible, by disposing the second input shaft, which transmits a large torque, on the outer peripheral side of the double tube and supporting it directly on the transmission case due to the double tube structure formed from the first input shaft and the second input shaft, to support the first output switching mechanism with high rigidity without carrying out special reinforcement.

Moreover, in accordance with the third aspect of the present invention, since the first fixed pulley and the second fixed pulley are disposed at mutually diagonal positions, the first movable pulley and the second movable pulley are disposed at mutually diagonal positions, one of the gears forming the speed increasing mechanism is disposed on the rear face side of the second fixed pulley, the second output switching mechanism and the output shaft are disposed on the rear face side of the first fixed pulley, and the first output switching mechanism and the second output switching mechanism are disposed at positions where at least parts thereof overlap one another in the axial direction, it is possible, by utilizing effectively dead space formed on the rear face side of the first and second fixed pulleys, to dispose one of the gears forming the speed increasing mechanism, the first output switching mechanism, and the second output switching mechanism, thus enabling the size of the continuously variable transmission to be reduced.

Furthermore, in accordance with the fourth aspect of the present invention, since the first fixed pulley and the second fixed pulley are disposed at mutually diagonal positions, the first movable pulley and the second movable pulley are disposed at mutually diagonal positions, one of the gears forming the speed increasing mechanism is disposed on the rear face side of the second movable pulley, the second output switching mechanism and the output shaft are disposed on the rear face side of the first fixed pulley, and the first output switching mechanism (37) and the second output switching mechanism are disposed at positions where at least parts thereof overlap one another in the axial direction, it is possible, by utilizing effectively dead space formed on the rear face side of the second movable pulley and the first fixed pulley, to dispose one of the gears forming the speed increasing mechanism, the first output switching mechanism, and the second output switching mechanism, thus enabling the size of the continuously variable transmission to be reduced.

Moreover, in accordance with the fifth aspect of the present invention, since at least one of the first output switching mechanism and the second output switching mechanism is formed from a friction clutch, when the first output switching mechanism and the second output switching mechanism are simultaneously switched toward the output shaft side at the time of a transition mode between the LOW mode and the HI mode, even if differential rotation occurs on the downstream side of the first and second output switching mechanisms due to the ratio of the pulleys being changed by a change in oil pressure, etc., the differential rotation can be absorbed by slippage of the friction clutch.

Furthermore, in accordance with the sixth aspect of the present invention, not only can the effects of the fifth aspect be obtained due to the second output switching mechanism being formed from the friction clutch, but also since the friction clutch forms not the first output switching mechanism, through which a high torque passes when in the LOW mode, but the second output switching mechanism, through which a low torque passes when in the HI mode, the friction clutch can be of a small size that is commensurate with a low torque, thus enabling the continuously variable transmission to be lightened in weight.

Moreover, in accordance with the seventh aspect of the present invention, since the first output switching mechanism is formed from a dog clutch that can selectively join a first drive gear and a second drive gear, which are relatively rotatably supported on the second input shaft, to the second input shaft, the first drive gear is connected to a driven gear provided on the output shaft, and the second drive gear is connected to the first drive gear, or the driven gear provided on the output shaft via an idle shaft, it is possible for the first output switching mechanism to selectively establish the LOW mode and the RVS mode.

Furthermore, in accordance with the eighth aspect of the present invention, since the first input switching mechanism and the second input switching mechanism are integrated, compared with a case in which the first and second input switching mechanisms are separated and disposed on opposite sides in the axial direction of the belt type continuously variable transmission mechanism, the power transmission path and the support structure of the first and second input switching mechanisms can be simplified, thus enabling the size of the continuously variable transmission to be reduced.

Moreover, in accordance with the ninth aspect of the present invention, since the second input path also functions as the first output path, not only is it possible, by consolidating the transmission paths of the driving force, to reduce the size of the continuously variable transmission mechanism, but it is also possible to make the speed increasing mechanism of the second input path function as a speed decreasing mechanism, thus gaining a gear reduction ratio in the LOW mode.

Furthermore, in accordance with the tenth aspect of the present invention, when the gear ratio of the speed decreasing mechanism is $i_{red}$, the gear ratio of the speed increasing mechanism is $i_{ind}$, the minimum ratio between the first pulley and the second pulley is $i_{min}$, and the gear ratio between the first drive gear and the driven gear is $i_{sec}$, since the relationship $i_{red} \times i_{min} = i_{ind}$ and the relationship $i_{sec} = i_{red}$ hold, it is possible to smoothly operate the first output switching mechanism and the second output switching mechanism in a state in which there is no differential rotation at a time of transition from the LOW mode to the HI mode.

BRIEF DESCRIPTION OF DRAWINGS

FIG. 12 is a skeleton diagram of a continuously variable transmission. (second embodiment)

EXPLANATION OF REFERENCE NUMERALS AND SYMBOLS

Figure 1:
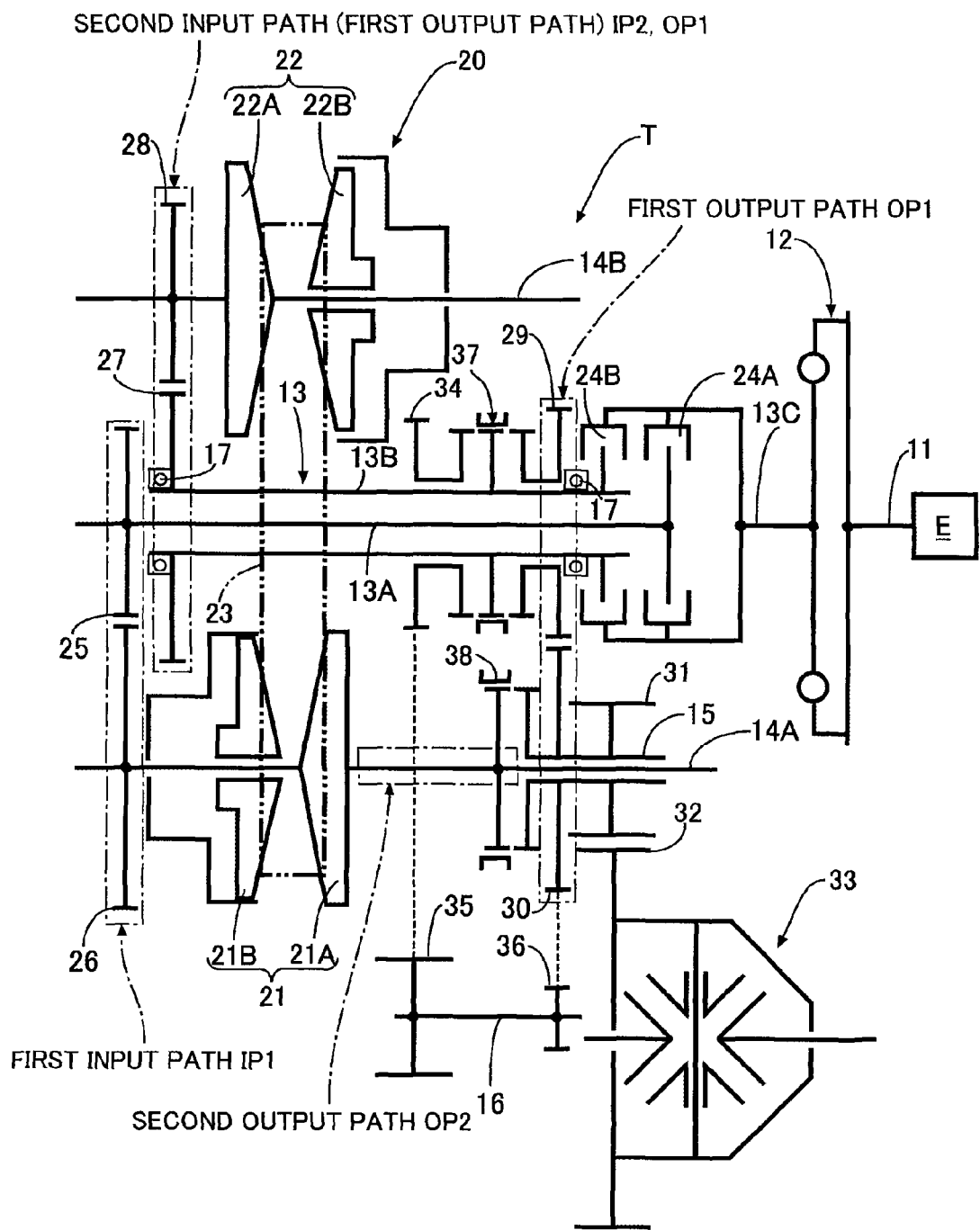
FIG. 1 is a skeleton diagram of a continuously variable transmission. (first embodiment)

13 Input shaft
13A First input shaft
13B Second input shaft
15 Output shaft
16, 16' Idle shaft
17 Bearing
20 Belt type continuously variable transmission mechanism
21 First pulley
21A First fixed pulley
21B First movable pulley
22 Second pulley
22A Second fixed pulley
22B Second movable pulley
23 Endless belt
24A LOW friction clutch (first input switching mechanism)
24B HI friction clutch (second input switching mechanism)
25 First reduction gear (speed decreasing mechanism)
26 Second reduction gear (speed decreasing mechanism)
27 First induction gear (speed increasing mechanism)
28 Second induction gear (speed increasing mechanism)
29 Third reduction gear (first drive gear)
30 Fourth reduction gear (driven gear)
34 Reverse drive gear (second drive gear)
37 First output switching mechanism
38 Second output switching mechanism
E Engine (drive source)
M Transmission case
IP1 First input path
IP2 Second input path
OP1 First output path
OP2 Second output path

MODES FOR CARRYING OUT THE INVENTION

A first embodiment of the present invention is explained below by reference to FIG. 1 to FIG. 11.

First Embodiment

As shown in FIG. 1, a continuously variable transmission T mounted on a vehicle includes an input shaft 13 that is connected to a crankshaft 11 of an engine E via a flywheel 12, and a first countershaft 14A, a second countershaft 14B, an output shaft 15, and an idle shaft 16 that are disposed in parallel to the input shaft 13. The input shaft 13 is formed from a first input shaft 13A, a tubular second input shaft 13B that is relatively rotatably fitted around the outer periphery of the first input shaft 13A, and a third input shaft 13C that is an output shaft for the flywheel 12 and is disposed coaxially with the first input shaft 13A. A LOW friction clutch 24A is disposed between the third input shaft 13C and the first input shaft 13A, and a HI friction clutch 24B is disposed between the third input shaft 13C and the second input shaft 13B. The LOW friction clutch 24A and the HI friction clutch 24B are integrated, and are disposed on end parts of the first input shaft 13A and the second input shaft 13B on the same side as the engine E when viewed from the continuously variable transmission mechanism T. The second input shaft 13B, which is disposed on the outer periphery of the first input shaft 13A, is supported on a transmission case M via bearings 17 and 17. The LOW friction clutch 24A also functions as a starting clutch for the vehicle.

A belt type continuously variable transmission mechanism 20 disposed between the first countershaft 14A and the second countershaft 14B includes a first pulley 21 provided on the first countershaft 14A, a second pulley 22 provided on the second countershaft 14B, and an endless belt 23 wound around the first and second pulleys 21 and 22. The groove widths of the first and second pulleys 21 and 22 are increased and decreased in opposite directions from each other by means of oil pressure, thus continuously changing the gear ratio between the first countershaft 14A and the second countershaft 14B. The first pulley 21 is formed from a first fixed pulley 21A fixed to the first countershaft 14A, and a first movable pulley 21B that can move toward and away from the first fixed pulley 21A. Furthermore, the second pulley 22 is formed from a second fixed pulley 22A fixed to the second countershaft 14B, and a second movable pulley 22B that can move toward and away from the second fixed pulley 22A. Furthermore, the first fixed pulley 21A of the first pulley 21 and the second fixed pulley 22A of the second pulley 22 are disposed at mutually diagonal positions, and the first movable pulley 21B of the first pulley 21 and the second movable pulley 22B of the second pulley 22 are disposed at mutually diagonal positions.

A first reduction gear 25 fixedly provided on the first input shaft 13A and a second reduction gear 26 fixedly provided on the first countershaft 14A are meshed together, and a first induction gear 27 fixedly provided on the second input shaft 13B and a second induction gear 28 fixedly provided on the second countershaft 14B are meshed together, the second induction gear 28 being disposed on the rear face side of the second fixed pulley 22A. The first induction gear 27 and the second induction gear 28 function as an induction gear in a HI mode, which is described later, but they function as a reduction gear in a LOW mode, which is described later, since the direction in which the driving force is transmitted is reversed.

Furthermore, a third reduction gear 29 relatively rotatably supported on the second input shaft 13B and a fourth reduction gear 30 on the outer periphery of the output shaft 15 relatively rotatably supported on the first countershaft 14A are meshed together, and a final drive gear 31 integral with the fourth reduction gear 30 via the output shaft 15 meshes with a final driven gear 32 provided on a differential gear 33. A reverse drive gear 34 relatively rotatably supported on the second input shaft 13B and a reverse idle gear 35 fixedly provided on the idle shaft 16 are meshed together, and a reverse driven gear 36 fixedly provided on the idle shaft 16 meshes with the fourth reduction gear 30.

Provided on the outer periphery of the second input shaft 13B is a first output switching mechanism 37, which is a dog clutch. The first output switching mechanism 37 can switch between a neutral position, a rightward-moved position, and a leftward-moved position; when it moves rightward from the neutral position the third reduction gear 29 is joined to the second input shaft 13B, and when it moves leftward from the neutral position the final drive gear 31 is joined to the second input shaft 13B. Provided on the outer periphery of the first countershaft 14A on the rear face side of the first fixed pulley 21A is a second output switching mechanism 38, which is a dog clutch. The second output switching mechanism 38 can switch between a neutral position and a rightward-moved position; when it moves rightward from the neutral position the fourth reduction gear 30 and the final drive gear 31 are joined to the first countershaft 14A. The first output switching mechanism 37 and the second output switching mechanism 38 are disposed at positions where at least parts thereof overlap one another in the axial direction.

The first and second reduction gears 25 and 26 reduce the speed of rotation of the first input shaft 13A and transmit it to the first countershaft 14A. On the other hand, the first and second induction gears 27 and 28 increase the speed of rotation of the second input shaft 13B and transmit it to the second countershaft 14B. The first reduction gear 25 and the second reduction gear 26 form a first input path IP1 of the first embodiment of the present invention, and the first induction gear 27 and the second induction gear 28 form a second input path IP2 of the first embodiment of the present invention. The second induction gear 28, the first induction gear 27, the third reduction gear 29, and the fourth reduction gear 30 form a first output path OP1 of the first embodiment of the present invention, and the first countershaft 14A between the first pulley 21 and the second output switching mechanism 38 forms a second output path OP2 of the first embodiment of the present invention.

When the gear ratio from the first reduction gear 25 to the second reduction gear 26 is defined as $i_{red}$, the gear ratio from the first induction gear 27 to the second induction gear 28 is defined as $i_{ind}$, and the minimum gear ratio from the first pulley 21 to the second pulley 22 of the belt type continuously variable transmission mechanism 20 is defined as $i_{min}$, the gear ratios are set so that $i_{red} \times i_{min} = i_{ind}$. When the gear ratio from the third reduction gear 29 to the fourth reduction gear 30 is defined as $i_{sec}$, the gear ratios are set so that $i_{sec} = i_{red}$.

Figure 2:
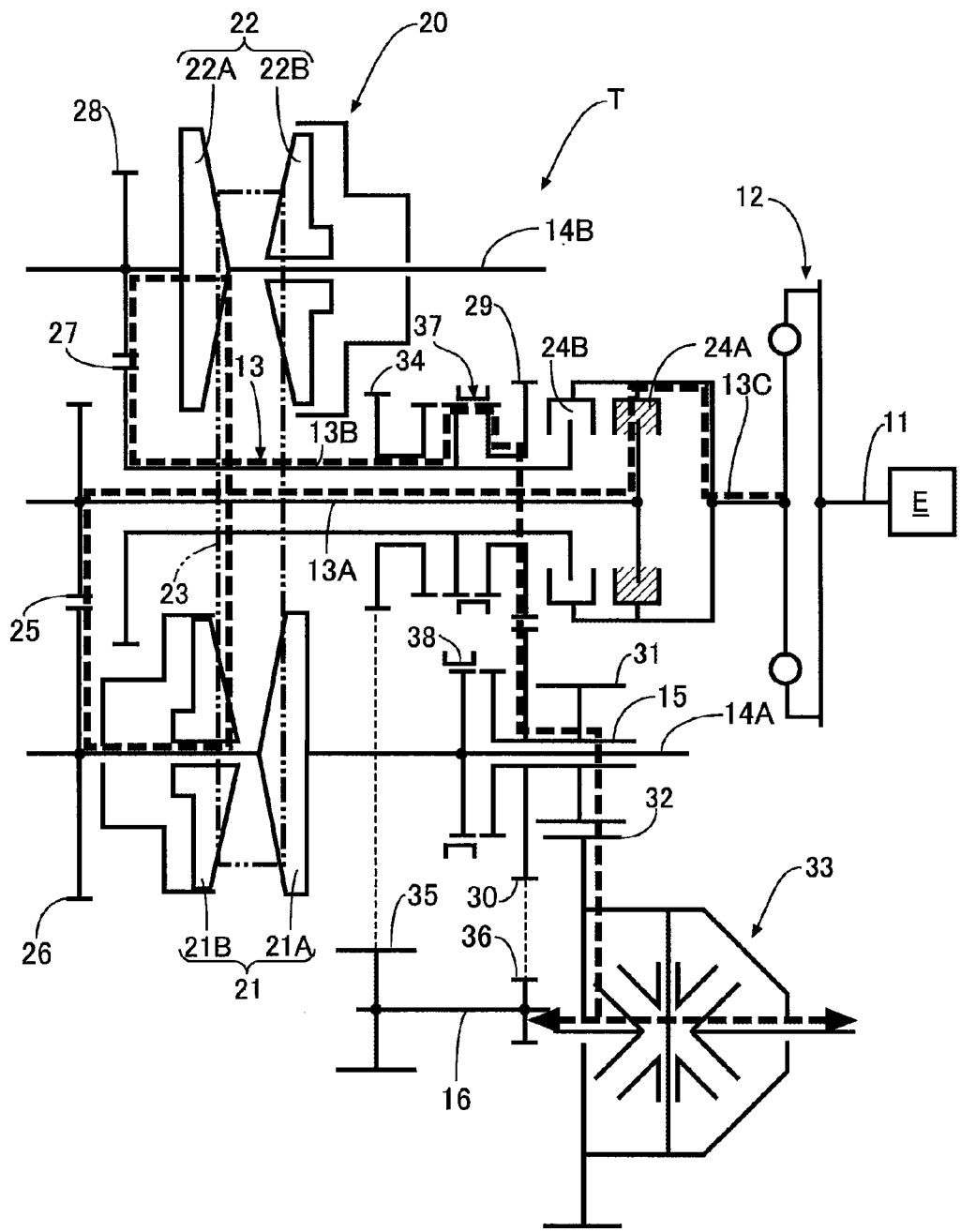
FIG. 2 is a torque flow diagram of a LOW mode. (first embodiment)

FIG. 2 shows the LOW mode of the continuously variable transmission T of the first embodiment. In the LOW mode, the LOW friction clutch 24A is engaged, the HI friction clutch 24B is disengaged, the first output switching mechanism 37 is operated to the rightward-moved position (LOW position), and the second output switching mechanism 38 is operated to the neutral position.

As a result, the driving force of the engine E is transmitted to the differential gear 33 via the path: crankshaft 11→flywheel 12→22 third input shaft 13C→LOW friction clutch 24A→first input shaft 13A→first reduction gear 25→second reduction gear 26→first countershaft 14A→first pulley 21→endless belt 23→second pulley 22→second countershaft 14B→second induction gear 28→first induction gear 27→second input shaft 13B→first output switching mechanism 37→third reduction gear 29→fourth reduction gear 30→output shaft 15→final drive gear 31→final driven gear 32.

In the LOW mode, the belt type continuously variable transmission mechanism 20 transmits the driving force from the first countershaft 14A side to the second countershaft 14B side, and according to the change in the gear ratio thereof the overall gear ratio of the continuously variable transmission T is changed.

Figure 3:
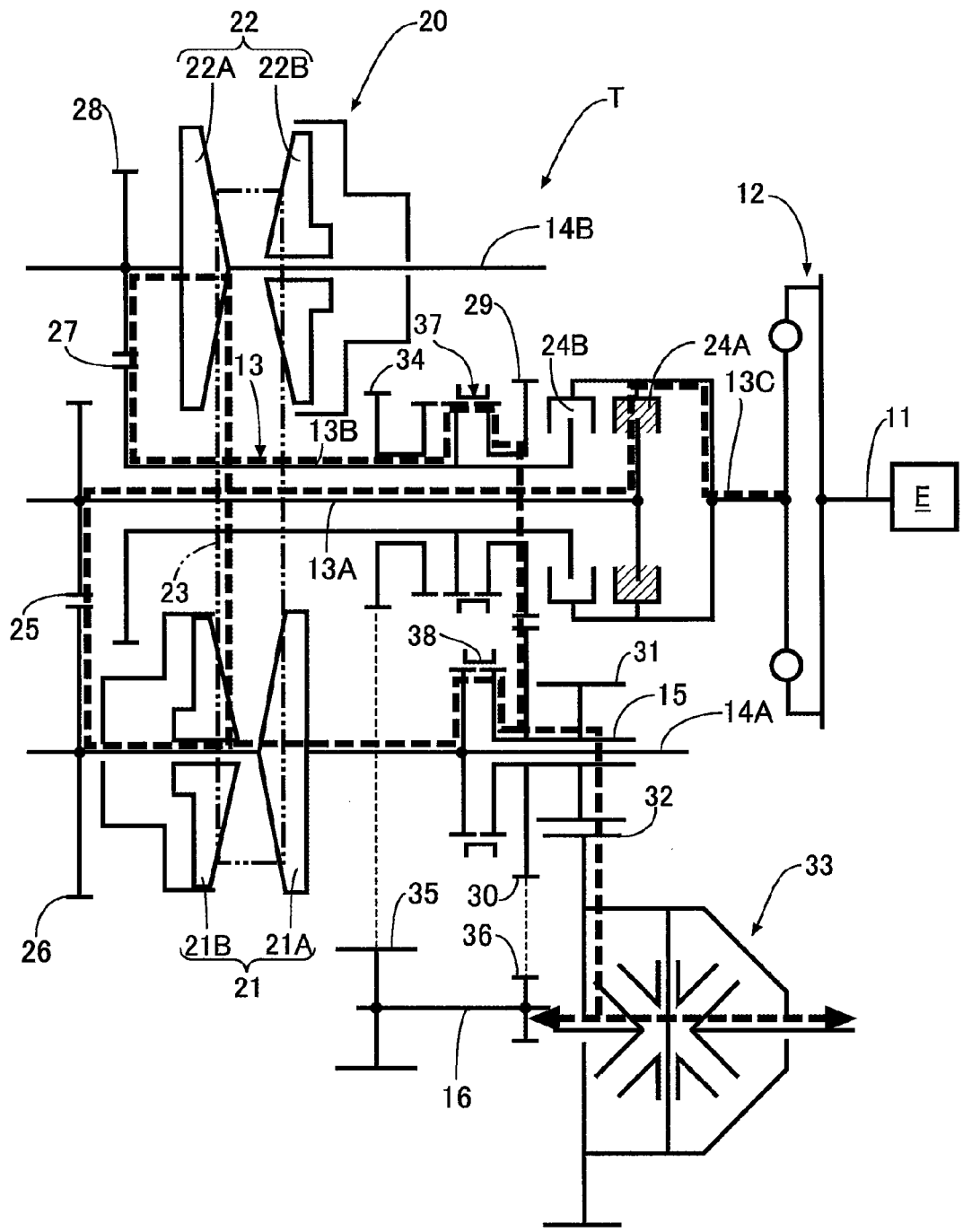
FIG. 3 is a torque flow diagram of transition mode 1. (first embodiment)

FIG. 3 shows a transition mode 1 as a first-half transition from the LOW mode to the HI mode, which is described later. In transition mode 1, the LOW friction clutch 24A is engaged, the HI friction clutch 24B is disengaged, the first output switching mechanism 37 is operated to the rightward-moved position (LOW position), the second output switching mechanism 38 is operated to the rightward-moved position (HI position), and the LOW mode and a directly coupled LOW mode (see FIG. 7), which is described later, are established at the same time.

Figure 4:
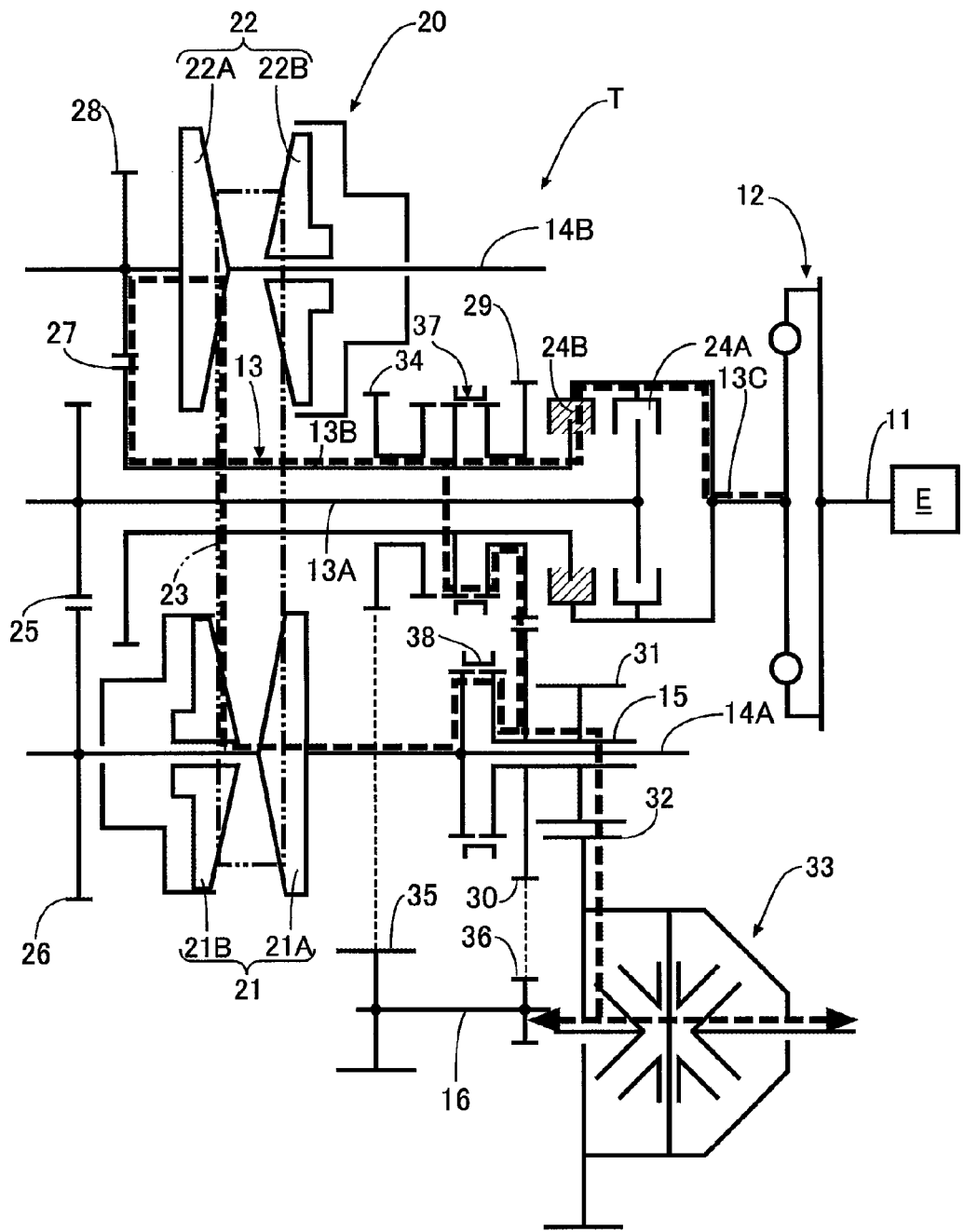
FIG. 4 is a torque flow diagram of transition mode 2. (first embodiment)

FIG. 4 shows a transition mode 2 as a second-half transition from the LOW mode to the HI mode, which is described later. In transition mode 2, the LOW friction clutch 24A is disengaged, the HI friction clutch 24B is engaged, the first output switching mechanism 37 is operated to the rightward-moved position (LOW position), the second output switching mechanism 38 is operated to the rightward-moved position (HI position), and the HI mode (see FIG. 5), which is described later, and a directly coupled HI mode (see FIG. 8), which is described later, are established at the same time.

Transition mode 1 and transition mode 2 are for smoothly carrying out a transition from the LOW mode to the HI mode, and details thereof are described later.

Figure 5:
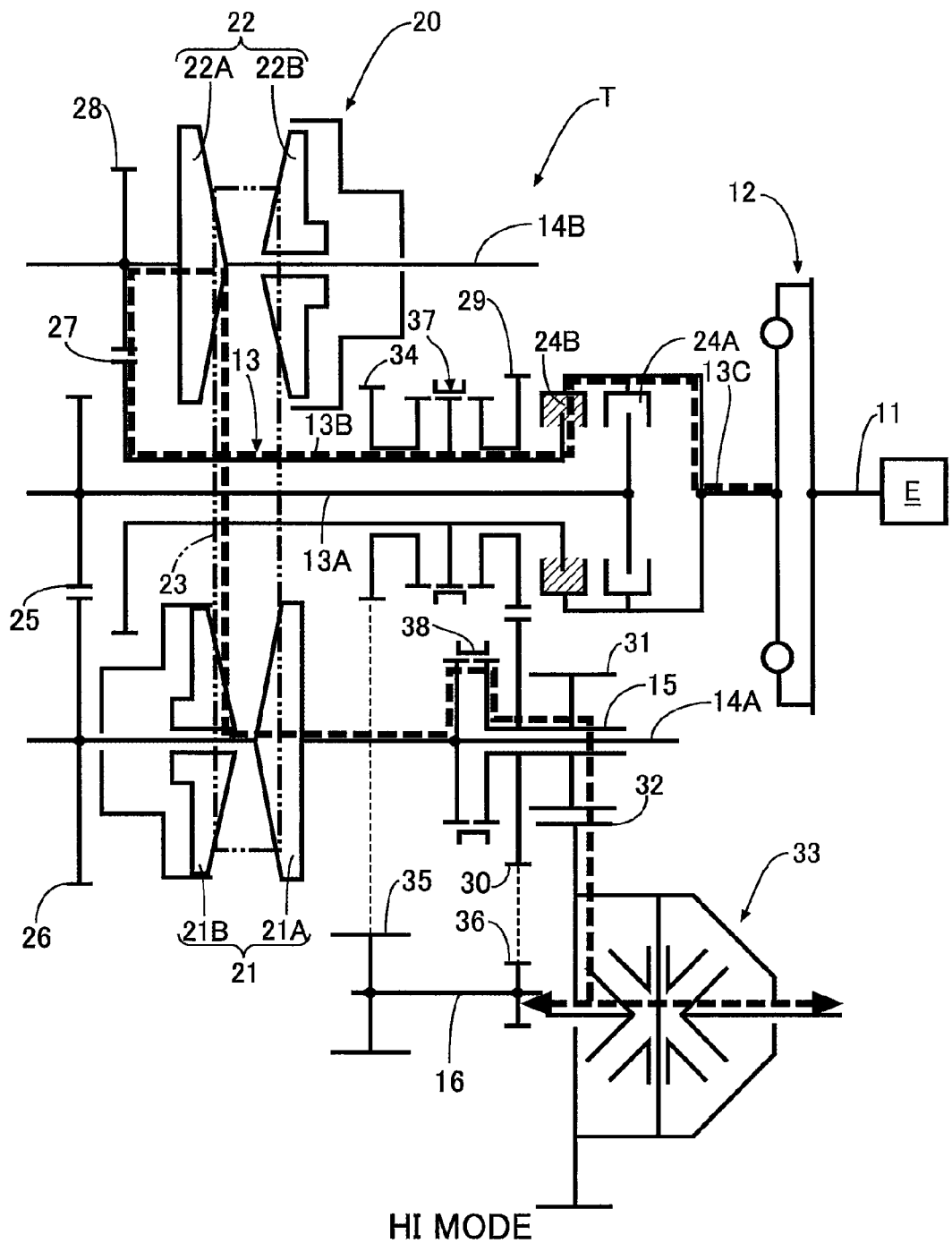
FIG. 5 is a torque flow diagram of a HI mode. (first embodiment)

FIG. 5 shows the HI mode of the continuously variable transmission T of the first embodiment. In the HI mode, the LOW friction clutch 24A is disengaged, the HI friction clutch 24B is engaged, the first output switching mechanism 37 is operated to the neutral position, and the second output switching mechanism 38 is operated to the rightward-moved position (HI position).

As a result, the driving force of the engine E is transmitted to the differential gear 33 via the path: crankshaft 11→flywheel 12→third input shaft 13C→HI friction clutch 24B→second input shaft 13B→first induction gear 27→second induction gear 28→second countershaft 14B→second pulley 22→endless belt 23→first pulley 21→first countershaft 14A→second output switching mechanism 38→output shaft 15→final drive gear 31→final driven gear 32.

In the HI mode, the belt type continuously variable transmission mechanism 20 transmits the driving force from the second countershaft 14B side to the first countershaft 14A side, and according to the change in the gear ratio thereof the overall gear ratio of the continuously variable transmission T is changed.

Figure 6:
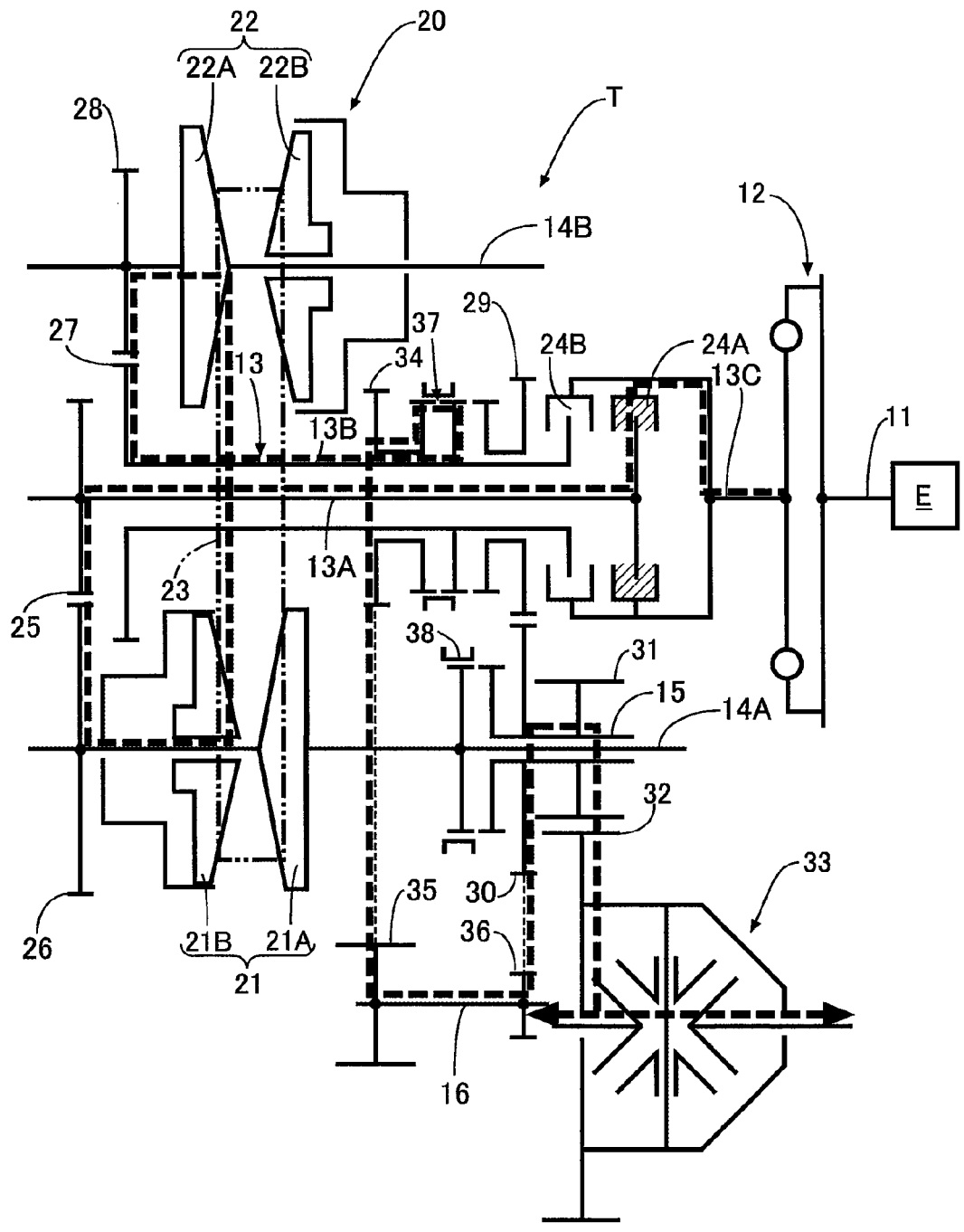
FIG. 6 is a torque flow diagram of a reverse mode. (first embodiment)

FIG. 6 shows a reverse mode of the continuously variable transmission T of the first embodiment. In the reverse mode, the LOW friction clutch 24A is engaged, the HI friction clutch 24B is disengaged, the first output switching mechanism 37 is operated to the leftward-moved position (RVS position), and the second output switching mechanism 38 is operated to the neutral position.

As a result, the driving force of the engine E is transmitted as reverse rotation to the differential gear 33 via the path: crankshaft 11→flywheel 12→third input shaft 13C→LOW friction clutch 24A→first input shaft 13A→first reduction gear 25→second reduction gear 26→first countershaft 14A→first pulley 21→endless belt 23→second pulley 22→second countershaft 14B→second induction gear 28→first induction gear 27→second input shaft 13B→first output switching mechanism 37→reverse drive gear 34→reverse idle gear 35→idle shaft 16→reverse driven gear 36→fourth reduction gear 30→output shaft 15→final drive gear 31→final driven gear 32.

In the reverse mode, the belt type continuously variable transmission mechanism 20 transmits the driving force from the first countershaft 14A side to the second countershaft 14B side, and according to the change in the gear ratio thereof the overall gear ratio of the continuously variable transmission T is changed.

Figure 7:
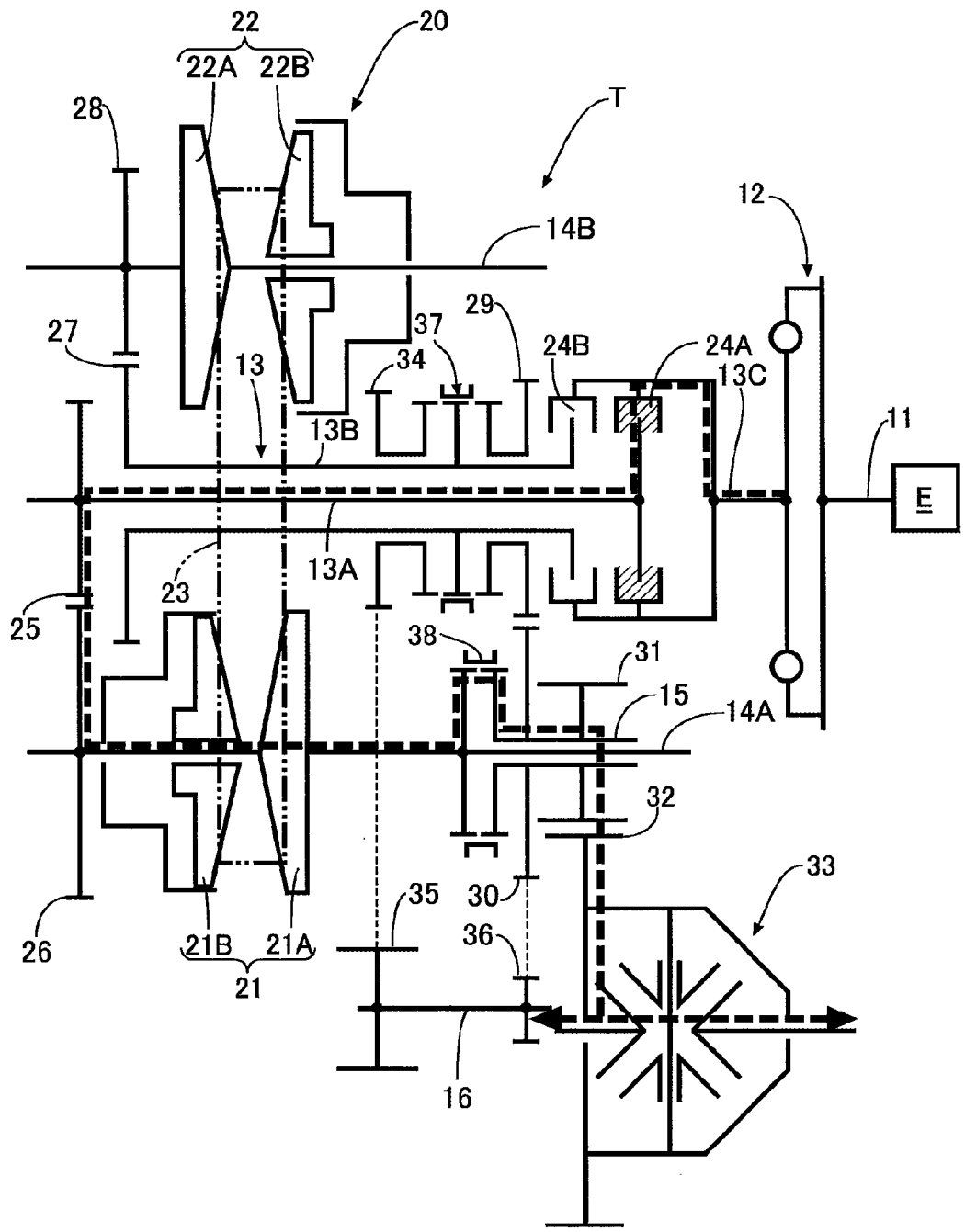
FIG. 7 is a torque flow diagram of a directly coupled LOW mode. (first embodiment)

FIG. 7 shows the directly coupled LOW mode of the continuously variable transmission T of the first embodiment. In the directly coupled LOW mode, the LOW friction clutch 24A is engaged, the HI friction clutch 24B is disengaged, the first output switching mechanism 37 is operated to the neutral position, and the second output switching mechanism 38 is operated to the rightward-moved position (HI position).

As a result, the driving force of the engine E is transmitted to the differential gear 33 via the path: crankshaft 11→flywheel 12→third input shaft 13C→LOW friction clutch 24A→first input shaft 13A→first reduction gear 25→second reduction gear 26→first countershaft 14A→second output switching mechanism 38→output shaft 15→final drive gear 31→final driven gear 32.

In the directly coupled LOW mode, the belt type continuously variable transmission mechanism 20 is not operated, and the overall gear ratio of the continuously variable transmission T is constant.

Figure 8:
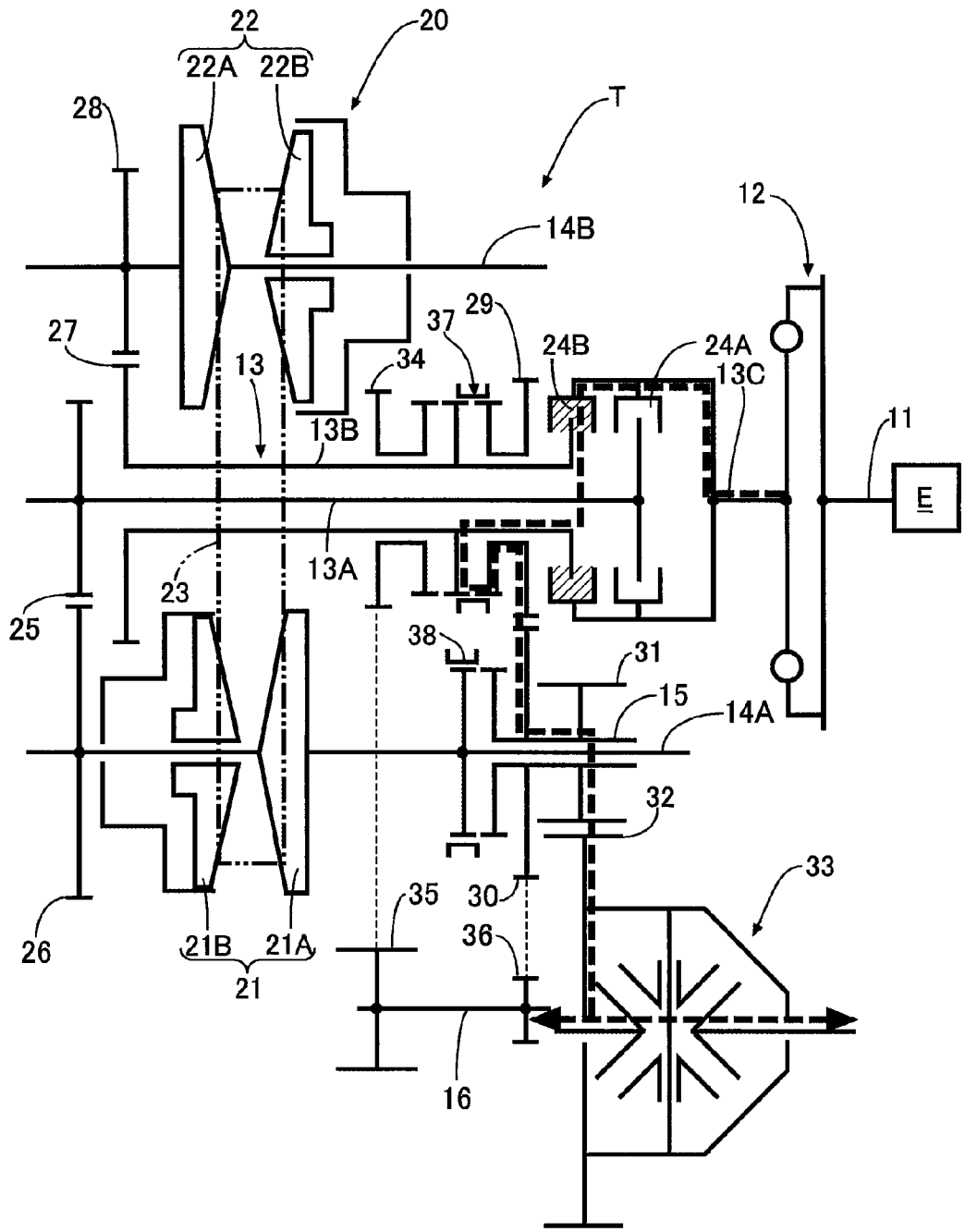
FIG. 8 is a torque flow diagram of a directly coupled HI mode. (first embodiment)

FIG. 8 shows the directly coupled HI mode of the continuously variable transmission T of the first embodiment. In the directly coupled HI mode, the LOW friction clutch 24A is disengaged, the HI friction clutch 24B is engaged, the first output switching mechanism 37 is operated to the rightward-moved position (LOW position), and the second output switching mechanism 38 is operated to the neutral position.

As a result, the driving force of the engine E is transmitted to the differential gear 33 via the path: crankshaft 11→flywheel 12→third input shaft 13C→HI friction clutch 24B→second input shaft 13B→first output switching mechanism 37→third reduction gear 29→fourth reduction gear 30→output shaft 15→final drive gear 31→final driven gear 32.

In the directly coupled HI mode, the belt type continuously variable transmission mechanism 20 is not operated, and the overall gear ratio of the continuously variable transmission T is constant.

The operation at a time of transition from the LOW mode to the HI mode in the first embodiment is now explained.

Figure 9:
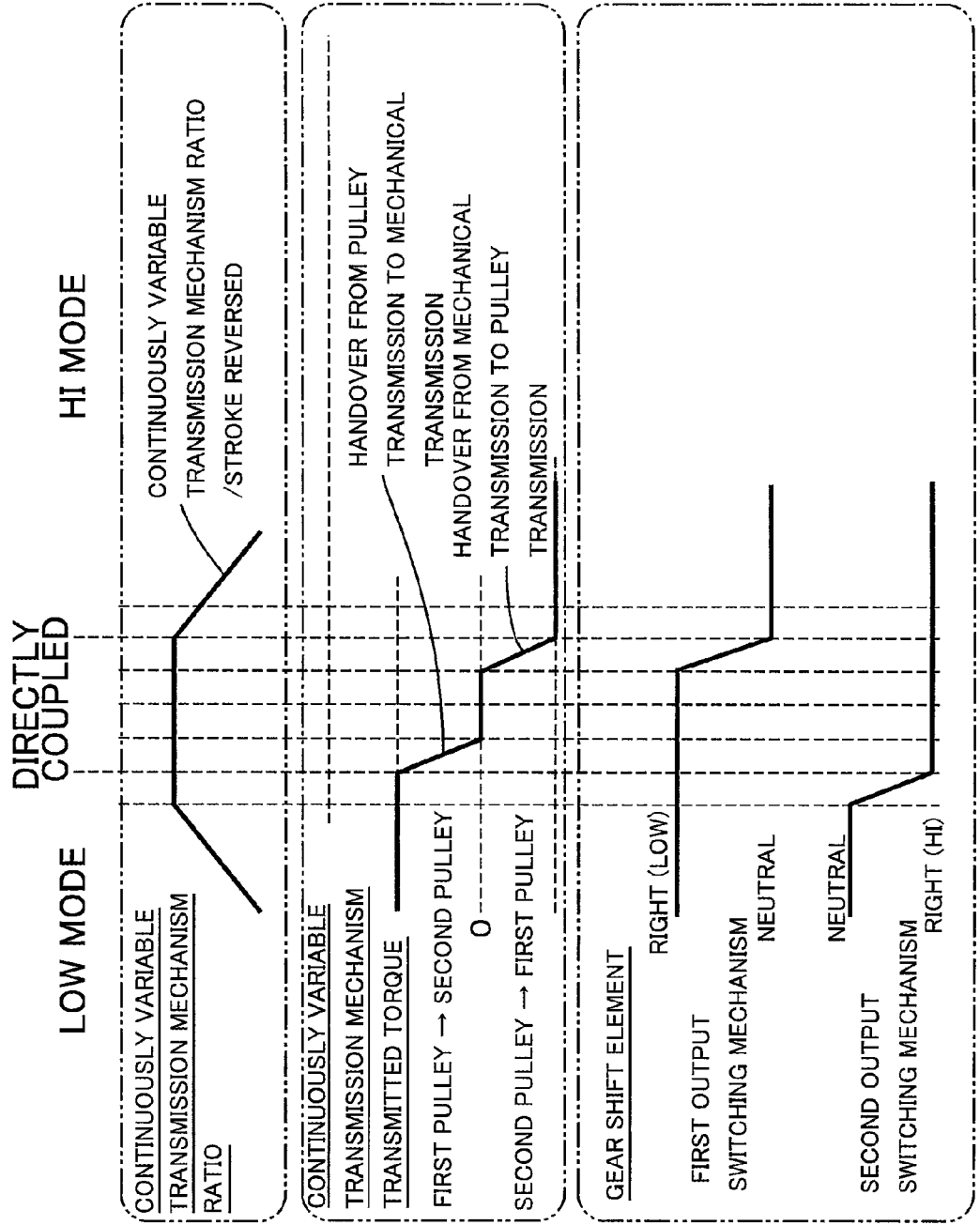
FIG. 9 is a diagram for explaining the transition between the LOW mode and the HI mode. (first embodiment)

As shown in FIG. 9, in the LOW mode shown in FIG. 2, when the gear ratio from the first pulley 21 to the second pulley 22 of the belt type continuously variable transmission mechanism 20 gradually decreases and attains the minimum gear ratio $i_{min}$, the second output switching mechanism 38, which has until this time been in the neutral position, is operated to the rightward-moved position (HI position), thus attaining transition mode 1 shown in FIG. 3. Subsequently, the engagement relationship between the LOW friction clutch 24A and the HI friction clutch 24B is switched over to thus attain transition mode 2 shown in FIG. 4, and the first output switching mechanism 37, which has been in the rightward-moved position (LOW position), is then operated to the neutral position, thus attaining the HI mode shown in FIG. 5.

At the end of the LOW mode and the beginning of the HI mode, the overall gear ratio of the continuously variable transmission T is the same, thereby preventing the occurrence of gear shift shock when switching from the LOW mode to the HI mode. It enables smooth operation of the first output switching mechanism 37, the second output switching mechanism 38, the LOW friction clutch 24A, and the HI friction clutch 24B by preventing the occurrence of differential rotation when the second output switching mechanism 38 is moved rightward to the HI position at a time of transition from the LOW mode to transition mode 1, when the LOW friction clutch 24A and the HI friction clutch 24B are interchangeably engaged at a time of transition from transition mode 1 to transition mode 2, and when the first output switching mechanism 37 moves leftward to the neutral position at a time of transition from transition mode 2 to the HI mode.

In order to explain this in detail, assume that the gear ratio $i_{red}$ from the first reduction gear 25 to the second reduction gear 26 is 1.5, the gear ratio $i_{ind}$ from the first induction gear 27 to the second induction gear 28 is 0.75, the minimum gear ratio $i_{min}$ from the first pulley 21 to the second pulley 22 of the belt type continuously variable transmission mechanism 20 is 0.5, the gear ratio $i_{sec}$ from the third reduction gear 29 to the fourth reduction gear 30 is 1.5, and the rotational speed of the input shaft 13 is 1500 rpm.

In the power transmission path of transition mode 1, the power transmission path of the LOW mode and the power transmission path of the directly coupled LOW mode coexist; in the power transmission path of the LOW mode, when the first input shaft 13A rotates at 1500 rpm, the first countershaft 14A is reduced in speed at $i_{red}$=1.5 to 1000 rpm by the first and second reduction gears 25 and 26, the second countershaft 14B is increased in speed at $i_{min}$=0.5 to 2000 rpm by the belt type continuously variable transmission mechanism 20, the second input shaft 13B is reduced in speed at the reciprocal of $i_{ind}$=0.75 to 1500 rpm by the second induction gear 28 and the first induction gear 27, and the output shaft 15 is reduced in speed at $i_{sec}$=1.5 by the third reduction gear 29 and the fourth reduction gear 30 and rotates at 1000 rpm. On the other hand, in the power transmission path of the directly coupled LOW mode, when the first input shaft 13A rotates at 1500 rpm, the first countershaft 14A is reduced in speed at $i_{red}$=1.5 to 1000 rpm by the first and second reduction gears 25 and 26, and the output shaft 15, which is directly coupled to the first countershaft 14A, rotates at 1000 rpm.

In the power transmission path of transition mode 2, the power transmission path of the HI mode and the power transmission path of the directly coupled HI coexist; in the power transmission path of the HI mode, the second input shaft 13B rotates at 1500 rpm, the second countershaft 14B is increased in speed at $i_{ind}$=0.75 by the first and second induction gears 27 and 28 and attains 2000 rpm, the first countershaft 14A is reduced in speed at $1/i_{min}$=2.0 by the belt type continuously variable transmission mechanism 20 and attains 1000 rpm, and the output shaft 15 directly coupled to the first countershaft 14A rotates at 1000 rpm. On the other hand, in the power transmission path of the directly coupled HI mode, when the second input shaft 13B rotates at 1500 rpm, the output shaft 15 is reduced in speed at $i_{sec}$=1.5 by the third reduction gear 29 and the fourth reduction gear 30 and rotates at 1000 rpm.

As described above, when shifting between the LOW mode, transition mode 1, transition mode 2, and the HI mode, the rotational speeds of the first input shaft 13A, the second input shaft 13B, the first countershaft 14A, the second countershaft 14B, and the output shaft 15 do not change at all, the gear ratio of the belt type continuously variable transmission mechanism 20 is maintained at $i_{min}$, and it is therefore possible to smoothly carry out operation of the first output switching mechanism 37, the second output switching mechanism 38, the LOW friction clutch 24A, and the HI friction clutch 24B without differential rotation.

Furthermore, at the time of transition from transition mode 1 to transition mode 2, the belt type continuously variable transmission mechanism 20 switches from the power transmission state of first pulley 21→second pulley 22 to the power transmission state of second pulley 22→first pulley 21, and there is an instant when torque transmission is temporarily interrupted. However, since at that instant the directly coupled LOW mode and the directly coupled HI mode are in existence to thus transmit torque, it is possible to prevent the occurrence of a shock due to interruption of torque transmission.

Figure 10:
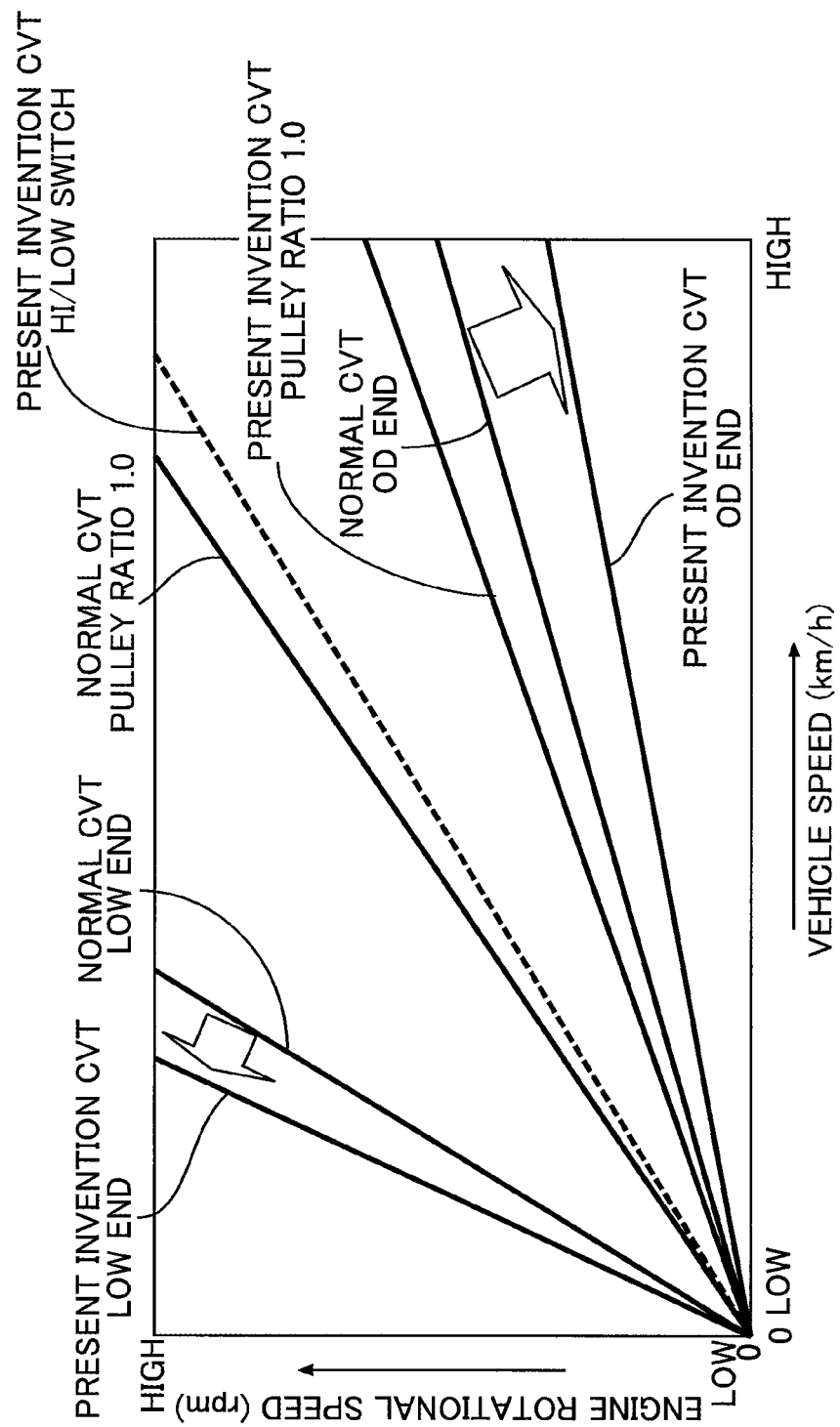
FIG. 10 is a diagram showing the relationship between overall gear ratio and gear ratio of a belt type continuously variable transmission mechanism. (first embodiment)
Figure 11:
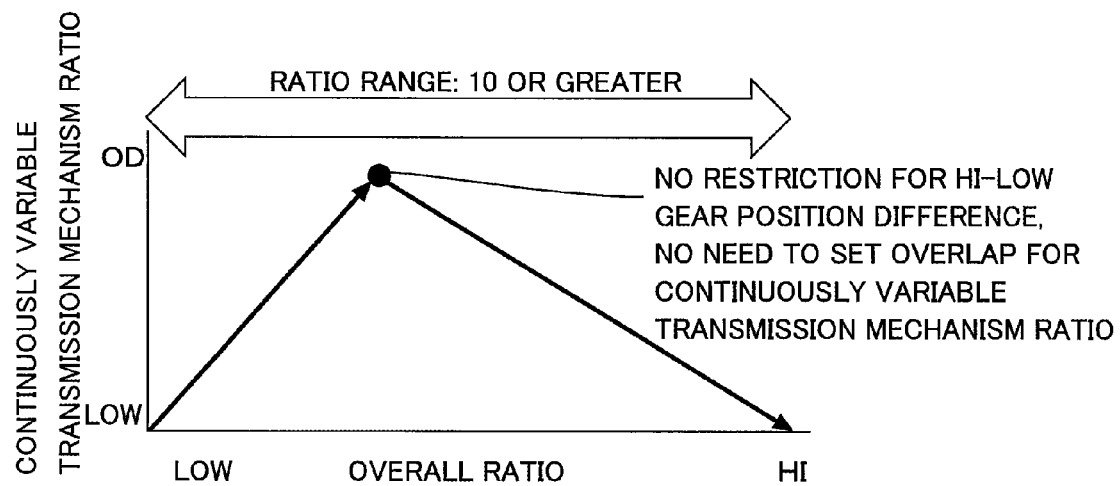
FIG. 11 is a diagram for explaining the difference in overall gear ratio between the invention of the present application and a Comparative Example. (first embodiment)

As described above, in accordance with the first embodiment, due to the belt type continuously variable transmission mechanism 20 being combined with the speed decreasing mechanism, which includes the first reduction gear 25, the second reduction gear 26, the first induction gear 27, the second induction gear 28, the third reduction gear 29, and the fourth reduction gear 30, and the speed increasing mechanism, which includes the first induction gear 27 and the second induction gear 28, as shown in FIG. 10, compared with a single belt type continuously variable transmission mechanism (overall gear ratio=about 6 to 7), the gear ratio on the LOW side and the gear ratio on the OD side are both increased, thus enabling an overall gear ratio as large as 10 or greater to be achieved (see FIG. 11). Furthermore, in the continuously variable transmission T of the present embodiment, the overall gear ratio when the gear ratio of the belt type continuously variable transmission mechanism 20 is 1.0 is a value close to the overall gear ratio at the OD end of the single belt type continuously variable transmission mechanism, and it can be seen that the effect in increasing the gear ratio on the OD side is particularly prominent.

In the LOW mode, since rotation of the engine E is reduced in speed with a high gear ratio and transmitted to the differential gear 33, a large torque acts on the first output switching mechanism 37 disposed in the power transmission path thereof. However, since the input shaft 13 supporting the first output switching mechanism 37 has a double tube structure in which the tubular second input shaft 13B is fitted onto the outer periphery of the inner first input shaft 13A, the rigidity can be enhanced and, moreover, since the second input shaft 13B is supported on the transmission case via the bearings 17 and 17, it becomes possible to support the first output switching mechanism 37 with high rigidity (see FIG. 1).

Furthermore, since the first fixed pulley 21A of the first pulley 21 and the second fixed pulley 22A of the second pulley 22 are disposed at mutually diagonal positions, the first movable pulley 21B of the first pulley 21 and the second movable pulley 22B of the second pulley 22 are disposed at mutually diagonal positions, the second induction gear 28 is disposed on the rear face side of the second fixed pulley 22A, the second output switching mechanism 38 and the output shaft 15 are disposed on the rear face side of the first fixed pulley 21A, and the first output switching mechanism 37 and the second output switching mechanism 38 are disposed at positions where at least parts thereof overlap one another in the axial direction, it is possible to utilize effectively dead space formed on the rear face side of the first and second fixed pulleys 21A and 22A, thereby enabling the size of the continuously variable transmission T to be reduced.

Furthermore, since the first output switching mechanism 37 is formed from a dog clutch in which the third reduction gear 29 and the reverse drive gear 34 relatively rotatably supported on the second input shaft 13B can be joined selectively to the second input shaft 13B, not only is it possible to reduce the drag resistance compared with a case in which a friction clutch is used, but it is also possible to selectively establish the LOW mode and a RVS mode merely by operating the first output switching mechanism 37 with a single actuator, thereby enabling the structure thereof to be simplified.

Moreover, since the LOW friction clutch 24A and the HI friction clutch 24B are integrated and disposed between the engine E and the belt type continuously variable transmission mechanism 20, compared with a case in which the LOW friction clutch 24A and the HI friction clutch 24B are separated and disposed at opposite ends of the input shaft 13, it is possible to simplify the support structure and the power transmission path therefor, thus enabling the size of the continuously variable transmission T to be reduced.

Furthermore, since the second input path IP2, which is formed from the first induction gear 27 and the second induction gear 28, also functions as the first output path OP1, that is, since the first induction gear 27 and the second induction gear 28 forming the speed increasing mechanism in the HI mode form the speed decreasing mechanism in the LOW mode, not only is it possible to consolidate the transmission paths for the driving force to thus enable the size of the continuously variable transmission T to be reduced, but it is also possible to gain a speed reduction ratio in the LOW mode.

A second embodiment of the present invention is now explained by reference to FIG. 12.

Second Embodiment

As shown in FIG. 12, in the second embodiment, an input shaft 13 is formed from a first input shaft 13A that is an output shaft of a flywheel 12, a tubular second input shaft 13B that is relatively rotatably fitted around the outer periphery of the first input shaft 13A, and a tubular third input shaft 13C that is relatively rotatably fitted around the outer periphery of the second input shaft 13B. A LOW friction clutch 24A and a HI friction clutch 24B, which are integrated, are disposed at the rear end of the first input shaft 13A so as to be positioned on the side opposite to an engine E when viewed from a continuously variable transmission mechanism T. The LOW friction clutch 24A is disposed between the first input shaft 13A and the third input shaft 13C, and the HI friction clutch 24B is disposed between the first input shaft 13A and the second input shaft 13B.

Furthermore, first and second induction gears 27 and 28 that form a second input path IP2 are disposed on the same side as the engine E when viewed from a belt type continuously variable transmission mechanism 20. The second induction gear 28, which is fixedly provided on a second countershaft 14B, is disposed on the rear face side of a second movable pulley 22B, and a first reduction gear 25 of a first input path IP1 disposed on the side opposite to the engine E when viewed from the belt type continuously variable transmission mechanism 20 is connected to the LOW friction clutch 24A via the third input shaft 13C. In this arrangement, the first reduction gear 25 may be connected directly to the output side of the LOW friction clutch 24A and the third input shaft 13C may be omitted. Furthermore, in the second embodiment, the LOW friction clutch 24A and the HI friction clutch 24B are arranged on the inner and outer peripheries to thus suppress any increase in length in the axial direction, but in the same manner as in the first embodiment a LOW friction clutch 24A and a HI friction clutch 24B having the same diameter may be disposed side by side.

Moreover, in the second embodiment a second output switching mechanism 38 is formed from a friction clutch, but a first output switching mechanism 37 may be formed from a friction clutch, or the first and second output switching mechanisms 37 and 38 may both be formed from a friction clutch.

Furthermore, in the second embodiment a reverse drive gear 34 relatively rotatably supported on the second input shaft 13B and a reverse idle gear 35 fixedly provided on an idle shaft 16 are meshed together via a second reverse idle gear 35' fixedly provided on a second idle shaft 16', and a reverse driven gear 36 is meshed with a fourth reduction gear 30, but the reverse drive gear 34 and the reverse idle gear 35 may be meshed directly together as in the first embodiment, and the reverse driven gear 36 may be meshed with the fourth reduction gear 30.

The second embodiment is different from the first embodiment only in the above terms, and otherwise has no differences from the first embodiment. That is, in both embodiments the second input shaft 13B having the first output switching mechanism 27 disposed on the outer periphery thereof is supported on a transmission case M via a bearing 17.

In such a second embodiment, in a LOW mode of the continuously variable transmission T, the LOW friction clutch 24A is engaged, the HI friction clutch 24B is disengaged, the first output switching mechanism 37 is operated to the rightward-moved position (LOW position), the second output switching mechanism 38 is disengaged, and the driving force of the engine E is transmitted to a differential gear 33 via the path: crankshaft 11→flywheel 12→first input shaft 13A→LOW friction clutch 24A→third input shaft 13C→first reduction gear 25→second reduction gear 26→first countershaft 14A→first pulley 21→endless belt 23→second pulley 22→second countershaft 14B→second induction gear 28→first induction gear 27→second input shaft 13B→first output switching mechanism 37→third reduction gear 29→fourth reduction gear 30→output shaft 15→final drive gear 31→final driven gear 32.

In a HI mode of the continuously variable transmission T, the LOW friction clutch 24A is disengaged, the HI friction clutch 24B is engaged, the first output switching mechanism 37 is operated to the neutral position, the second output switching mechanism 38 is engaged, and the driving force of the engine E is transmitted to the differential gear 33 via the path: crankshaft 11→flywheel 12→first input shaft 13A→HI friction clutch 24B→second input shaft 13B→first induction gear 27→second induction gear 28→second countershaft 14B→second pulley 22→endless belt 23→first pulley 21→second output switching mechanism 38→output shaft 15→final drive gear 31→final driven gear 32.

In a directly coupled LOW mode, the LOW friction clutch 24A is engaged, the HI friction clutch 24B is disengaged, the first output switching mechanism 37 is operated to the neutral position, the second output switching mechanism 38 is engaged, and the driving force of the engine E is transmitted to the differential gear 33 via the path: crankshaft 11→flywheel 12→first input shaft 13A→LOW friction clutch 24A→third input shaft 13C→first reduction gear 25→second reduction gear 26→first countershaft 14A→second output switching mechanism 38→output shaft 15→final drive gear 31→final driven gear 32, and in a directly coupled HI mode, the LOW friction clutch 24A is disengaged, the HI friction clutch 24B is engaged, the first output switching mechanism 37 is operated to the rightward-moved position (LOW position), the second output switching mechanism 38 is disengaged, and the driving force of the engine E is transmitted to the differential gear 33 via the path: crankshaft 11→flywheel 12→first input shaft 13A→HI friction clutch 24B→second input shaft 13B→first output switching mechanism 37→third reduction gear 29→fourth reduction gear 30→output shaft 15→final drive gear 31→final driven gear 32.

In a transition mode 1 in which there is a transition from the LOW mode to the HI mode, in a first-half transition mode 1, the LOW friction clutch 24A is engaged, the HI friction clutch 24B is disengaged, the first output switching mechanism 37 is operated to the rightward-moved position (LOW position), the second output switching mechanism 38 is engaged, and the LOW mode and the directly coupled LOW mode are thus established at the same time, and in a second-half transition mode 2 the LOW friction clutch 24A is disengaged, the HI friction clutch 24B is engaged, the first output switching mechanism 37 is operated to the rightward-moved position (LOW position), the second output switching mechanism 38 is engaged, and the HI mode and the directly coupled HI mode are established at the same time. When these modes are established at the same time, it goes without saying that the gear ratios between the respective gears and the gear ratio of the continuously variable transmission T are fixed at values that do not cause any difference in rotational speed of the output shaft 15 in the first and second output paths.

In a reverse mode, the LOW friction clutch 24A is disengaged, the HI friction clutch 24B is engaged, the first output switching mechanism 37 is operated to the leftward-moved position (RVS position), the second output switching mechanism 38 is disengaged, and the driving force of the engine E is transmitted as reverse rotation to the differential gear 33 via the path: crankshaft 11→flywheel 12→first input shaft 13A→HI friction clutch 24B→second input shaft 13B→first output switching mechanism 37→reverse drive gear 34→second reverse idle gear 35'→reverse idle gear 35→idle shaft 16→reverse driven gear 36→third reduction gear 29→fourth reduction gear 30→output shaft 15→final drive gear 31→final driven gear 32.

As described above, in accordance with the second embodiment, as in the first embodiment, not only is it possible to increase both the gear ratio on the LOW side and the gear ratio on the OD side to achieve an overall gear ratio as large as 10 or greater, but since the input shaft 13 supporting the first output switching mechanism 37 has a double tube structure in which the tubular second input shaft 13B is fitted onto the outer periphery of the inner first input shaft 13A, the rigidity can also be enhanced and, moreover, since the second input shaft 13B is supported on the transmission case via the bearings 17 and 17, it becomes possible to support the first output switching mechanism 37 with high rigidity Furthermore, since the first fixed pulley 21A of the first pulley 21 and the second fixed pulley 22A of the second pulley 22 are disposed at mutually diagonal positions, the first movable pulley 21B of the first pulley 21 and the second movable pulley 22B of the second pulley 22 are disposed at mutually diagonal positions, the second induction gear 28 is disposed on the rear face side of the second movable pulley 22B, the second output switching mechanism 38 and the output shaft 15 are disposed on the rear face side of the first fixed pulley 21A, and the first output switching mechanism 37 and the second output switching mechanism 38 are disposed at positions where at least parts thereof overlap one another in the axial direction, it is possible to utilize effectively dead space formed on the rear face side of the second movable pulley 22B and the first fixed pulley 21A, thereby enabling the size of the continuously variable transmission T to be reduced.

Furthermore, since at least one of the first output switching mechanism 37 and the second output switching mechanism 38 is formed from a friction clutch, when the first output switching mechanism 37 and the second output switching mechanism 38 are simultaneously switched toward the output shaft side at the time of a transition mode between the LOW mode and the HI mode, even if differential rotation occurs on the downstream side of the first and second output switching mechanisms 37 and 38 due to the ratio of the pulleys 21 and 22 being changed by a change in oil pressure, etc., the differential rotation can be absorbed by slippage of the friction clutch. Moreover, in the present embodiment, since not the first output switching mechanism, through which a high torque passes when in the LOW mode, but the second output switching mechanism, through which a low torque passes when in the HI mode, is formed in particular from a friction clutch, the friction clutch can be of a small size that is commensurate with a low torque, thus enabling the continuously variable transmission to be lightened in weight.

Furthermore, due to the first output switching mechanism 37 being formed from a dog clutch in which the third reduction gear 29 and the reverse drive gear 34 relatively rotatably supported on the second input shaft 13B can be joined selectively to the second input shaft 13B, not only is it possible to reduce the drag resistance compared with a case in which the first output switching mechanism 37 is formed from a friction clutch, but it is also possible to selectively establish the LOW mode and the RVS mode merely by operating the first output switching mechanism 37 with a single actuator, thereby enabling the structure thereof to be simplified.

Moreover, since the LOW friction clutch 24A and the HI friction clutch 24B are integrated and disposed between the engine E and the belt type continuously variable transmission mechanism 20, compared with a case in which the LOW friction clutch 24A and the HI friction clutch 24B are separated and disposed at opposite ends of the input shaft 13, it is possible to simplify the support structure and the power transmission path therefor, thus enabling the size of the continuously variable transmission T to be reduced.

Furthermore, since the second input path IP2, which is formed from the first induction gear 27 and the second induction gear 28, also functions as the first output path OP1, that is, since the first induction gear 27 and the second induction gear 28 forming the speed increasing mechanism in the HI mode form the speed decreasing mechanism in the LOW mode, not only is it possible to consolidate the transmission paths for the driving force to thus enable the size of the continuously variable transmission T to be reduced, but it is also possible to gain a speed reduction ratio in the LOW mode.

Moreover, due to gear engagement in the forward LOW mode and gear engagement in the reverse mode being carried out by separate clutches, that is, the LOW friction clutch 24A and the HI friction clutch 24B, compared with a case in which gear engagement in forward/reverse switching for a short time is carried out using one and the same clutch, there is little influence from clutch residual pressure, and the marketability can be enhanced.

First and second embodiments of the present invention are explained above, but the present invention may be modified in a variety of ways as long as the modifications do not depart from the spirit and scope thereof.

For example, in the first and second embodiments the flywheel 12 is disposed between the engine E and the input shaft 13, but the flywheel 12 can be eliminated and replaced by a torque converter. By so doing, the starting mechanism shifts from the LOW friction clutch 24A, which also functions as a starting clutch, to the torque converter, and it is therefore possible to reduce the external diameter of the LOW friction clutch 24A.

Furthermore, the drive source of the present invention is not limited to the engine E and may be a drive source of another type such as a motor/generator.

The invention claimed is:

1. A continuously variable transmission comprising:
an input shaft into which driving force from a drive source is inputted;
a belt type continuously variable transmission mechanism that is formed from a first pulley, a second pulley and an endless belt, an output shaft that outputs the driving force whose speed has been changed by the belt type continuously variable transmission mechanism;
a first input path that transmits the driving force from the drive source to the first pulley; first input switching mechanism that switches the driving force from the drive source toward the first input path side;
a speed decreasing mechanism that is disposed in the first input path and decreases the speed of an input to the first pulley;
a second input path that transmits the driving force from the drive source to the second pulley;
a second input switching mechanism that switches the driving force from the drive source toward the second input path side;
a speed increasing mechanism that is disposed in the second input path and increases the speed of an input to the second pulley;
a first output path that outputs the driving force from the second pulley;
a second output path that outputs the driving force from the first pulley;
a first output switching mechanism that is disposed in the first output path and switches the driving force from the second pulley toward the output shaft side; and
a second output switching mechanism that is disposed in the second output path and switches the driving force from the first pulley toward the output shaft side,
wherein
the first and second input switching mechanisms are disposed on the same side as the drive source when viewed from the belt type continuously variable transmission mechanism (20),
the input shaft comprises:
a first input shaft that transmits the driving force from the first input switching mechanism to the first input path and a second input shaft that transmits the driving force from the second input switching mechanism to the second input path, the second input shaft is relatively rotatably disposed on an outer periphery of the first input shaft and supported on a transmission case via a bearing, the first output switching mechanism is disposed on the second input shaft, and the second output switching mechanism is disposed on a rotating shaft of the first pulley.

2. A continuously variable transmission comprising:
an input shaft into which driving force from a drive source is inputted,
a belt type continuously variable transmission mechanism (20) that is formed from a first pulley, a second pulley and an endless belt, an output shaft that outputs the driving force whose speed has been changed by the belt type continuously variable transmission mechanism;

a first input path that transmits the driving force from the drive source to the first pulley;

a first input switching mechanism that switches the driving force from the drive source toward the first input path side, a speed decreasing mechanism that is disposed in the first input path and decreases the speed of an input to the first pulley;

a second input path that transmits the driving force from the drive source to the second pulley;

a second input switching mechanism that switches the driving force from the drive source toward the second input path side, a speed increasing mechanism that is disposed in the second input path and increases the speed of an input to the second pulley;

a first output path that outputs the driving force from the second pulley, a second output path that outputs the driving force from the first pulley;

a first output switching mechanism that is disposed in the first output path and switches the driving force from the second pulley toward the output shaft side, and a second output switching mechanism that is disposed in the second output path and switches the driving force from the first pulley toward the output shaft side, wherein the first and second input switching mechanisms are disposed on a side opposite to the drive source when viewed from the belt type continuously variable transmission mechanism, the input shaft comprises:

a first input shaft that transmits the driving force from the drive source to the first and second input switching mechanisms and a second input shaft that transmits the driving force from the second input switching mechanism to the second input path, the second input shaft is relatively rotatably disposed on an outer periphery of the first input shaft and supported on a transmission case via a bearing, the first output switching mechanism is disposed on the second input shaft, and the second output switching mechanism is disposed on a rotating shaft of the first pulley.

3. The continuously variable transmission according to claim 1, wherein the first pulley comprises a first fixed pulley and a first movable pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions, one of gears forming the speed increasing mechanism is disposed on a rear face side of the second fixed pulley, the second output switching mechanism and the output shaft are disposed on a rear face side of the first fixed pulley, and the first output switching mechanism and the second output switching mechanism are disposed at positions where at least parts thereof overlap one another in an axial direction.

4. The continuously variable transmission according to claim 2, the first pulley comprises a first fixed pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions, one of gears forming the speed increasing mechanism is disposed on a rear face side of the second movable pulley, the second output switching mechanism and the output shaft are disposed on a rear face side of the first fixed pulley, and the first output switching mechanism and the second output switching mechanism are disposed at positions where at least parts thereof overlap one another in an axial direction.

5. The continuously variable transmission according to claim 1, wherein at least one of the first output switching mechanism and the second output switching mechanism is formed from a friction clutch.

6. The continuously variable transmission according to claim 5, wherein the second output switching mechanism is formed from a friction clutch.

7. The continuously variable transmission according to claim 1, wherein the first output switching mechanism is formed from a dog clutch that can selectively join a first drive gear and a second drive gear, which are relatively rotatably supported on the second input shaft, to the second input shaft, the first drive gear is connected to a driven gear provided on the output shaft, and the second drive gear is connected to the first drive gear or the driven gear via an idle shaft.

8. The continuously variable transmission according to claim 1, wherein the first input switching mechanism and the second input switching mechanism are integrated.

9. The continuously variable transmission according to claim 1, wherein the first output path also functions as the second input path.

10. The continuously variable transmission according to claim 7, wherein when a gear ratio of the speed decreasing mechanism is $i_{red}$, a gear ratio of the speed increasing mechanism is $i_{ind}$, the minimum ratio between the first pulley and the second pulley is $i_{min}$, and a gear ratio between the first drive gear and the driven gear is $i_{sec}$, the relationship $i_{red} \times i_{min} = i_{ind}$ and the relationship $i_{sec} = i_{red}$ hold.

* * * * *